United States Patent [19]

Plavac

[11] Patent Number: 4,521,610

[45] Date of Patent: Jun. 4, 1985

[54] POLY(OXYALKYLENE) AMINOETHER CARBAMATES AS DEPOSIT CONTROL ADDITIVES

[75] Inventor: Frank Plavac, Pinole, Calif.

[73] Assignee: Chevron Research Company, San Francisco, Calif.

[21] Appl. No.: 429,695

[22] Filed: Sep. 30, 1982

[51] Int. Cl.$^3$ .......................................... C07C 125/065
[52] U.S. Cl. ........................................ 560/27; 560/29; 560/159; 44/71
[58] Field of Search ................. 560/27, 29, 159; 44/71

[56] References Cited

U.S. PATENT DOCUMENTS

| | | | |
|---|---|---|---|
| 3,359,303 | 12/1967 | Coker | 560/159 |
| 3,454,625 | 7/1969 | Eiseman | 560/159 |
| 4,160,648 | 7/1979 | Lewis | 560/159 |
| 4,163,088 | 7/1979 | Kunzel | 560/159 |
| 4,191,537 | 3/1980 | Lewis | 560/159 |
| 4,197,409 | 4/1980 | Lilburn | 560/159 |
| 4,233,168 | 11/1980 | Lewis | 560/159 |
| 4,294,714 | 10/1981 | Lewis | 560/159 |

*Primary Examiner*—Michael L. Shippen
*Attorney, Agent, or Firm*—S. R. LaPaglia; J. M. Whitney; Q. Todd Dickinson

[57] ABSTRACT

Deposit control additives to maintain cleanliness in internal combustion engines are provided. The additives are hydrocarbyl-terminated poly(oxyalkylene) aminohydrocarbyloxyhydrocarbyl carbamates, also referred to as polyether aminoether carbamates.

8 Claims, No Drawings

POLY(OXYALKYLENE) AMINOETHER CARBAMATES AS DEPOSIT CONTROL ADDITIVES

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, ventures, intake ports and intake valves. The reduction of these deposit levels has resulted in increased engine efficiency and a reduction in the level of hydrocarbon and carbon monoxide emissions.

Thus, the introduction of fuel compositions containing deposit control additives has resulted in many cases in the reduction of harmful atmospheric pollutants and since greater engine efficiencies are maintained, fuel savings.

A complicating factor has, however, recently arisen. With the advent of automobile engines that require the use of non-leaded gasolines (to prevent disablement of catalytic converters used to reduce emissions), it has been difficult to provide gasoline of high enough octane to prevent knocking and the concomitant damage which it causes. The chief problem lies in octane requirement increase, herein called "ORI", which is caused by deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period will reach equilibrium. This is apparently caused by an amount of deposits in the combustion chamber. Equilibrium is typically reached after 5,000 to 15,000 miles of automobile operation.

Octane requirement increase, measured in particular engines with commercial gasolines, will vary at equilibrium from 5 to 6 octane units to as high as 12 or 15 units, depending upon the gasoline compositions, engine design and type of operation. The seriousness of the problem is thus apparent. A typical automobile with a research octane requirement of 85 when new may after a few months of operation require 97 research octane gasoline for proper operation, and little unleaded gasoline of that octane is available. The ORI problem exists to some degree with engines operated on leaded fuels. U.S. Pat. Nos. 3,144,311 and 3,146,203 disclose lead-containing fuel compositions having reduced ORI properties.

It is believed, however, by many experts that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, some of the presently used nitrogen-containing deposit control additives and the mineral oil or polymer carriers commonly used with such additives appear to contribute significantly to the ORI of engines operated on unleaded fuel.

It is, therefore, highly desirable to provide deposit control additives which effectively control deposits in intake systems (carburetor, valves, etc.) of engines operated with fuels containing them, but do not contribute to the combustion chamber deposits which cause increased octane requirements.

2. Description of the Prior Art

U.S. Pat. No. 3,658,882 discloses certain aryl carbamates and quaternary derivatives thereof useful as antistatic agents. U.S. Pat. No. 4,236,020 discloses compounds suitable for deposit control in fuel compositions which are hydrocarbylpoly(oxyalkylene)aminocarbamates of ethylenediamine. U.S. Pat. No. 4,288,612 teaches hydrocarbyl-terminated poly(oxyalkylene)aminocarbamates useful as deposit control agents in fuel compositions.

SUMMARY OF THE INVENTION

Deposit control additives are provided which are hydrocarbylpoly(oxyalkylene)amino hydrocarbyloxyhydrocarbyl carbamates having molecular weights from about 500 to about 10,000. The molecules of the composition are composed of moieties, wherein the hydrocarbylpoly(oxyalkylene) moiety is composed of oxyalkylene units selected from $C_2$-$C_5$ oxyalkylene units of which a sufficient number are branched-chain oxyalkylene units to render said aminoether carbamates soluble in liquid hydrocarbons, said hydrocarbyl group containing from 1 to 30 carbon atoms; wherein the diaminohydrocarbyloxyhydrocarbyl moiety comprises linear, cyclic, or branched oxyalkylene groups of from 1 to 12 carbon atoms, or oxyarylene groups of from 2 to 24 carbon atoms bound on either end by an amino group; and wherein the composition contains from 1 to 10 said hydrocarbyloxyhydrocarbyl moiety and wherein the two moieties above are joined together by a carbamate linking group.

DETAILED DESCRIPTION OF THE INVENTION

As disclosed above, the poly(oxyalkylene)aminohydrocarbyloxyhydrocarbyl carbamate of the present invention consists of various moieties: a hydrocarbyl-capped poly(oxyalkylene) moiety; and a diaminohydrocarbyloxyhydrocarbyl moiety bonded through a carbamate linkage, i.e.,

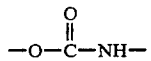

The poly(oxyalkylene) moiety of the additive is selected to provide solubility in liquid hydrocarbons, i.e., those boiling in the gasoline range. The compounds of the present invention may also be referred to for brevity's sake herein as polyether aminoether carbamates.

Poly(oxyalkylene) Moiety

The hydrocarbyl-terminated poly(oxyalkylene)-polymers which are utilized in preparing the carbamates of the present invention are monohydroxy compounds, i.e., alcohols, often termed monohydroxy polyethers, or polyalkylene glycol monohydrocarbylethers, or "capped" poly(oxyalkylene)glycols and are to be distinguished from the poly(oxyalkylene)glycols, or polyols, which are not hydrocarbyl-terminated, i.e., not capped. The hydrocarbyl-terminated poly(oxyalkylene) alcohols are produced by the addition of lower alkylene oxides, such as oxirane, ethylene oxide, propylene oxide, the butylene oxides, or the pentylene oxides to the hydroxy compound ROH under polymerization conditions, wherein R is the hydrocarbyl group which caps the poly(oxyalkylene) chain. Methods of production and properties of these polymers are disclosed in U.S. Pat. Nos. 2,841,479 and 2,782,240, and Kirk-Othmer's "Encyclopedia of Chemical Technology", Volume 19, p. 507. In the polymerization reaction, a single type of alkylene oxide may be employed, e.g., propylene oxide, in which case the product is a homopolymer, e.g., a poly(oxypropylene)propanol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene)polymers for the practice of the present invention.

In general, the poly(oxyalkylene)polymers are mixtures of compounds that differ in polymer chain length. However, their properties closely approximate those of the polymer represented by the average composition and molecular weight.

The hydrocarbylpoly(oxyalkylene) moiety of the carbamate consists of one or more hydrocarbyl-terminated poly(oxyalkylene)polymers composed of oxyalkylene units containing from 2 to about 5 carbon atoms. The polymers are bound to the carbamate via the oxygen atom of carbamate linkages, and the poly(oxyalkylene) moiety consists of at least one such poly(oxyalkylene)polymer. The hydrocarbyl group contains from 1 to about 30 carbon atoms, preferably from 2 to about 20 carbon atoms. Preferably the oxyalkylene units contain from 3 to 4 carbon atoms and the molecular weight of the hydrocarbylpoly(oxyalkylene) moiety is from about 500 to about 10,000, more preferably from about 500 to about 5,000. Each poly(oxyalkylene)polymer contains at least 5 oxyalkylene units, preferably 8 to about 100 oxyalkylene units, more preferably about 10 to 100 units and most preferably 10 to about 25 such units. In general, the oxyalkylene units may be branched or unbranched. Preferably the poly(oxyalkylene)polymer chain contains at least some $C_3$-$C_5$ oxyalkylene units, more preferably branched $C_3$-$C_5$ oxyalkylene units are present in at least sufficient number to render the carbamate soluble in liquid hydrocarbons. This solubility condition is satisfied if the carbamate is soluble in hydrocarbons boiling in the gasoline range, at least to the extent of about 30 to 2,000 ppm by weight and/or in hydrocarbon oils of lubricating viscosity at least to the extent of 0.01 to 5 weight percent. A poly(oxyalkylene)polymer chain composed of branched three and/or four carbon oxyalkylene units in at least sufficient amount to effect solubility in a fuel composition is most preferred. The preferred poly(oxyalkylene) compounds are composed, at least in part, of the branched oxyalkylene isomers, particularly oxypropylene, and oxybutylene units which are obtained from 1,2-propylene oxide and from 1,2-butylene oxide, respectively.

The hydrocarbyl moiety (R-) which terminates the poly(oxyalkylene) chain contains from 1 to about 30 carbon atoms, preferably from 2 to about 20 carbon atoms, and is generally derived from the monohydroxy compound (ROH) which is the initial site of the alkylene oxide addition in the polymerization reaction. Such monohydroxy compounds are preferably aliphatic or aromatic alcohols of from 1 to about 30 carbon atoms, more preferably an alkanol or an alkylphenol, and most preferably an alkylphenol wherein the alkyl is a straight- or branched-chain of from 1 to 24 carbon atoms. The hydrocarbyl component of the poly(oxyalkylene) moiety preferably denotes an organic radical composed of carbon and hydrogen which may be aliphatic, alicyclic, aromatic or combinations thereof, i.e., aralkyl. Preferably, the hydrocarbyl group will be relatively free of aliphatic unsaturation, i.e., ethylenic and acetylenic, particularly acetylenic unsaturation.

Aminohydrocarbyloxyhydrocarbyl Moiety

The aminohydrocarbyloxyhydrocarbyl moiety, also referred to as the aminoether moiety, of the polyether aminoether carbamate is preferably derived from a diamine having an amino group (or amine nitrogen atom) at either end of the molecule and separated by a hydrocarbyloxyhydrocarbyl sub-moiety. The diamine is preferably reacted with a hydrocarbylpoly(oxyalkylene)chloroformate to produce the hydrocarbylpoly(oxyalkylene)aminohydrocarbyloxyhydrocarbyl carbamate finding use within the present invention. Preferably, the diamine provides the product polyether aminopolyether carbamate with, on the average, at least one basic nitrogen atom per carbamate molecule, i.e., a nitrogen atom titratable by a strong acid.

The diaminoether moiety may be represented by the formula:

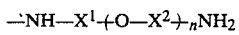

within which the ether sub-moiety is represented by $—X^1\!\!+\!\!O—X^2\!\!+\!\!_n$. In the ether sub-moiety, $X^1$ and $X^2$ represent linking groups selected from (A) linear, cyclic, or branched alkylene groups containing 1 to 6 carbon atoms, or (B) arylene groups of from 6 to 12 carbon atoms. These groups may also be optionally substituted with 1 or 2 groups selected from (C) hydroxyl, alkoxyl, alkyl alkoxyl nitrile, amino, or thio, or any alkyl or alkaryl group also substituted with these functional groups. Although the above (C) substituents are strictly not hydrocarbyl in nature, the term "hydrocarbyl" will be used to refer to the $X^1$ and $X^2$ groups in the aminohydrocarbyloxyhydrocarbyl moiety for the sake of ease in nomenclature and because the preferred embodiments of the invention are composed of either group (A) or (B) components. Although $X^1$ and $X^2$ are selected from the same groups of substituents, they are independent one from the other and may be the same or different. They may also be selected from different groups, i.e., one from (A) and one from (B) in the same molecule, although preferably they will be selected from the same group. "n" represents the number of repeating subgroups within the ether sub-moiety and is from 1 to 10. The molecule is so structured that within the aminoether moiety, the nitrogen atoms at either end of the moiety are only bonded to carbon atoms in the ether sub-moieties, not to an oxygen atom.

The more preferred diaminoethers finding use within the scope of the present inventions are alkylene ether diamines. Preferably the diaminoethers contain from 2 to 60 carbon atoms, more preferably each of the ether sub-moieties contains 4 to 16 carbon atoms. The number of oxygen atoms in the ether sub-moiety ranges from 1 to 10 but is more preferably from 1 to 4. Typical diaminoethers examples which illustrate the present invention include: 3-Oxapentane-1,5-diamine; 3,6-Dioxaoctane-1,8-diamine; 3,6,9-Trioxaundecane-1,11-diamine; 4,9-Dioxadodecane-1,12-diamine; and 4,7,10-Trioxatridecane-1,13-diamine.

As detailed above, the $X^1$ and $X^2$ sub-groups of the ether sub-moiety may also be substituted with arylene groups and/or alkylene and arylene groups substituted with the functional groups selected from group (C) above. Examples of those compounds would include: 4,4-Diaminodiphenyl ether and 4,9-Dioxadodecane-11-hydroxy-1,12-diamine.

Hydrocarbylpoly(oxyalkylene)Aminohydrocarbyloxyhydrocarbyl Carbamate

Having described the diaminoether component and the poly(oxyalkylene) component, the poly(oxyalkylene)aminoether carbamate additive of the present invention is obtained by linking these components together through a carbamate linkage, i.e.

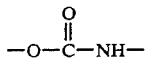

wherein the oxygen may be regarded as the terminal hydroxyl oxygen of the poly(oxyalkylene) alcohol component, and the carbonyl group, —C(O)— is preferably provided by the coupling agent, e.g. phosgene.

The poly(oxyalkylene)aminoether carbamate of the present invention preferably has at least one basic nitrogen atom per molecule. A "basic nitrogen atom" is one that is titratable by a strong acid, e.g., a primary, secondary, or tertiary amino nitrogen, as distinguished from, for example, amido nitrogen,

which is not as titratable. Preferably, the basic nitrogen atom is in a primary or secondary amino group.

The preferred poly(oxyalkylene)aminoether carbamate has a molecular weight of from about 500 to 10,000 [representing an average maximum distribution of poly(oxyalkylene)polymer in the compound] and more preferably from about 500 to about 5,000.

The class of preferred carbamates may be described by the following general formula:

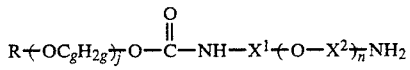

wherein
n is an integer from 1 to 10;
g is an integer from 2 to 5;
j is an integer such that the molecular weight of the compound is in the range of about 500 to about 5,000;
R is a hydrocarbyl group of from 1 to 30 carbon atoms;
$X^1$ and $X^2$ are the same or different substituents selected from the groups consisting of the aforementioned (A), (B), and (C); and
$X^2$ can vary independently up to n number of times, each independent $X^2$ substituent being selected from the groups consisting of the aforementioned (A), (B), and (C);

and at least a sufficient number of oxyalkylene units $(OC_gH_{2g})$ are branched-chain oxyalkylene units to render said compound soluble in liquid hydrocarbons. Preferably j is about 5 to 25, g is 4, and n is 1 to 4.

Preparation of the Poly(oxyalkylene)Aminoether Carbamates

The additives of this invention may be most conveniently prepared by first reacting the appropriate hydrocarbylpoly(oxyalkylene) alcohol with phosgene to produce a hydrocarbylpoly(oxyalkylene)chloroformate. The chloroformate is then reacted with the appropriate diaminoether as detailed above in the presence of a tertiary amine base, e.g., triethylamine, to produce the appropriate poly(oxyalkylene)aminoether carbamate.

The reaction of the poly(oxyalkylene) compound and phosgene is usually carried out on an essentially equimolar basis, although excess phosgene can be used to improve the degree of reaction. The reaction may be carried out at temperatures from $-10°$ to $100°$ C., preferably in the range of $0°$ to $50°$ C. The reaction will usually be complete within $\frac{1}{4}$ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from $-10°$ to $200°$ C. may be utilized, the desired product may be obtained by water wash and stripping, usually by the aid of vacuum, of any residual solvent.

The mol ratio of the basic amine nitrogen to polyether chloroformate will generally be in the range from about 2 to 20 mols of basic amine nitrogen per mol of chloroformate, and more usually 5 to 15 mols of basic amine nitrogen per mol of chloroformate. Since suppression of polysubstitution of the diaminoethers is usually desired, large molar excesses of the diamine will be used. Additionally, the preferred adduct is the monocarbamate compound, as opposed to the bis(carbamate) or disubstituted aminoether.

The reaction or reactions may be conducted with or without the presence of a reaction solvent. A reaction solvent is generally employed whenever necessary to reduce the viscosity of the reaction product. These solvents should be stable and inert to the reactants and reaction product. Depending on the temperature of the reaction, the particular chloroformate used, the mol ratios, as well as the reactant concentrations, the reaction time may vary from less than 1 minute to 3 hours.

After the reaction has been carried out for a sufficient length of time, the reaction mixture may be subjected to extraction with a hydrocarbon-water or hydrocarbon-alcohol-water medium to free the product from any low-molecular-weight amine salts which have formed and any unreacted diamine. The product may then be isolated by evaporation of the solvent. Further purification may be effected by column chromatography on silica gel.

Depending on the particular application of the composition of this invention, the reaction may be carried out in the medium in which it will ultimately find use, e.g., polyether carriers or an oleophilic organic solvent or mixtures thereof and be formed at concentrations which provide a concentrate of a detergent composition. Thus, the final mixture may be in a form to be used directly for blending in fuels.

Fuel Compositions

The polyether aminoether carbamates will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2,000 weight parts per million, and preferably from 100 to 500 ppm of polyether aminoether carbamate per part of base fuel is needed to achieve the best results. When other detergents are present, a lesser amount of polyether aminoether carbamate may be used. For performance as a carburetor detergent only, lower concentrations, for example 30 to 70 parts per million may be preferred.

The deposit control additive may also be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 10 percent by weight and generally not exceed 70 percent by weight, preferably 10 to 50 weight percent and most preferably from 10 to 25 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

EXAMPLES

The following examples are presented to illustrate specific embodiments of the practice of this invention and should not be interpreted as limitations upon the scope of the invention.

EXAMPLE 1

Reaction of Alkylphenolpoly(oxybutylene)chloroformate With 4,9-Dioxadodecane-1,12-diamine 4,9-Dioxadodecane-1,12-diamine (34 g, 0.167 mol) was dissolved in 500 ml of ether. The solution was cooled to 0° C. and triethylamine (9.3 ml, 0.067 mol) was added. A solution of alkylphenylpoly(oxybutylene)chloroformate (50 g, 0.033 mol) dissolved in 300 ml of ether was added dropwise over a 1-hour period. The reaction mixture was then stirred at room temperature for 20 hours. Potassium carbonate was then added. The mixture was filtered and the solvent was removed under vacuum. This material was taken up with excess petroleum ether and washed with four portions of water. The organic layer was dried over potassium carbonate and filtered. Solvent removal under vacuum gave 51.8 g of yellow oil.

This material was column chromatographed on silica gel using 1:4 methanol/methylene chloride to elute. 20.2 g of clear oil was obtained (Rf=0.18). The product contained 1.51% nitrogen and 0.79% basic nitrogen. The product showed a strong carbamate absorption at 1725 cm$^{-1}$.

EXAMPLE 2

Reaction of Alkylphenolpoly(oxybutylene)chloroformate With 4,7,10-Trioxatridecane-1,13-diamine 4,7,10-Trioxatridecane-1,13-diamine (35 g, 0.16 mol) was dissolved in 500 ml of ether. The solution was cooled to 0° C. and triethylamine (9.3 ml, 0.067 mol) was added. A solution of alkylphenolpoly(oxybutylene)chloroformate (50 g, 0.033 mol) dissolved in 500 ml of ether was added dropwise over a 1-hour period. The reaction mixture was then stirred at room temperature for 20 hours. Potassium carbonate was then added. The mixture was filtered and the solvent was removed under vacuum. This material was taken up with excess petroleum ether and washed with four portions of saturated brine. The organic layer was dried over potassium carbonate and filtered. Solvent removal under vacuum gave 54 g of yellow oil.

This material was column chromatographed on silica gel using 1:4 methanol/methylene chloride to elute. 20 g of clear oil was obtained (Rf=0.18). The product contained 1.42% nitrogen and 0.73% basic nitrogen. The product showed a strong carbamate absorption at 1725 cm$^{-1}$.

EXAMPLE 3

Reaction of Alkylphenolpoly(oxybutylene)chloroformate With 4,4'-diaminodiphenyl Ether 4,4'-Diaminodiphenyl ether (20 g, 0.1 mol) was dissolved in 500 ml of acetone and 20 ml of pyridine. A drying tube and dropping funnel were attached. A solution of alkylphenolpoly(oxybutylene)chloroformate (50 g, 0.033 mol) dissolved in 100 ml of acetone was added slowly dropwise over a period of 30 minutes. The reaction mixture was stirred at room temperature for 24 hours. The solvent was removed under vacuum and the residue was stripped several times with toluene. The residue was then taken up in excess petroleum ether. Potassium carbonate was added and the mixture was filtered. The filtrate was washed twice with saturated sodium bicarbonate and dried over potassium carbonate. The solution was filtered and stripped several times with toluene. Complete solvent removal under vacuum gave 46 g of clear amber oil.

This material was column chromatographed on silica gel using 30% ethyl acetate/hexane to elute. 19.3 g of clear oil was obtained (Rf=0.33). The product contained 1.40% nitrogen and 0.70% basic nitrogen. The product showed a strong carbamate absorption at 1745 cm$^{-1}$.

The poly(oxyalkylene)aminoether carbamates were blended in gasoline and their deposit reducing capacity tested in an ASTM/CFR Single-Cylinder Engine Test.

In carrying out the tests, a Waukesha CFR single-cylinder engine is used. The test is carried out for approximately 15 hours, at the end of which time the intake valve is removed, washed with hexane and weighed. The previously determined weight of the clean valve is subtracted from the weight of the valve after the test run. The difference between the two weights is the weight of the deposit; the lesser the amount of the deposit measured connoting a superior result. The operating conditions of the test are as follows: water jacket temperature 100° C. (212° F.), manifold vacuum of 12 in. Hg.; intake mixture temperature of 50.2° C. (125° F.); air-fuel ratio of 12; ignition spark timing of 40°BTC; engine speed of 1,800 rpm; the crankcase oil is commercial 30W oil.

The amount of carbonaceous deposit in milligrams on the intake valves is measured and reported in the following Tables I and II. The base fuel tested is a regular octane unleaded gasoline containing no fuel detergent. Poly(oxybutylene)ethylenediamine carbamate (PDC) is also treated for comparison and is prepared as disclosed in U.S. Pat. No. 4,288,612.

TABLE I

Intake Valve Deposit Test[1]
Polyether Aminoether Carbamate

| Description | Deposit Weight (mg) |
| --- | --- |
| Base fuel | 70.7 |
| PDC (ethylenediamine) | 18.4 |
| 4,7,10-Trioxatridecane-1,13-diamine | 6.1 |
| 4,9-Dioxadodecane-1,12-diamine | 11.9 |

[1]Based on the average of 2 runs at 200 ppm of additive.

TABLE II

Intake Valve Deposit Test[2]
Polyether Aminoether Carbamate

| Description | Deposit Weight (mg) |
| --- | --- |
| Base fuel | 58.6 |
| PDC (ethylenediamine) | 24.3 |
| 4,4'-Diaminodiphenyl Ether | 33.1 |

[2]Based on the average of 3 runs at 200 ppm of additive.

This data show the additives of this invention have excellent deposit control properties, approaching and in some cases surpassing that of a known deposit control additive.

The specific embodiments of the invention having been described in detail, it should be understood that the invention is to be given broadest possible interpretation within the terms the following claims.

What is claimed is:

1. A compound of the formula

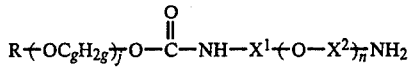

wherein n is an integer from 1 to 10; g is an integer from 2 to 5; j is an integer such that the molecular weight of the compound is in the range of about 500 to 10,000; R is a hydrocarbyl group of from about 1 to 30 carbon atoms; and $X^1$ and $X^2$ are the same or different substituents selected from the group consisting of (A) alkylene groups containing 1 to 6 carbon atoms; (B) arylene groups of from 6 to 12 carbon atoms; and (C) groups selected from (A) and (B) and substituted with groups selected from hydroxyl, alkoxyl, nitrile, amino, and alkyl and/or aryl groups substituted with substituents selected from hydroxyl, alkoxyl, nitrile, amino groups; and wherein $X^2$ can vary independently within the groups consisting of (A), (B) and (C) up to n times.

2. The compound as claimed in claim 1 in which j is 5 to 25, g is 4, and n is 1 to 4.

3. A compound of the formula defined in claim 1 having a molecular weight of about 500 to 5,000.

4. A compound of the formula defined in claim 1 having a molecular weight of about 1,200 to 5,000.

5. A compound of the formula defined in claim 1 wherein g is an integer from 3 to 4.

6. A compound of the formula defined in claim 1 wherein —($OC_gH_{2g}$)— is oxybutylene.

7. A compound of the formula defined in claim 1 wherein R is an alkyl or alkyl phenyl group.

8. A compound of the formula defined in claim 1 wherein the —NH—$X^1$—(O—$X^2$)$_n$NH$_2$ diaminoether is selected from 4,9-dioxadodecane-1,12-diamine; 4,7,10-trioxatridecane-1,13-diamine; and 4,4-diaminodiphenylether.

* * * * *